United States Patent
Fritz et al.

(10) Patent No.: US 11,813,630 B2
(45) Date of Patent: Nov. 14, 2023

(54) COATING METHOD AND CORRESPONDING COATING DEVICE

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/532,411

(22) Filed: Nov. 22, 2021

(65) Prior Publication Data
US 2022/0080445 A1 Mar. 17, 2022

Related U.S. Application Data

(63) Continuation of application No. 16/468,690, filed as application No. PCT/EP2017/081114 on Dec. 1, 2017, now Pat. No. 11,203,030.

(30) Foreign Application Priority Data

Dec. 14, 2016 (DE) ..................... 10 2016 014 944.2

(51) Int. Cl.
*B05B 13/04* (2006.01)
*B41J 3/407* (2006.01)
(Continued)

(52) U.S. Cl.
CPC ...... *B05B 13/0452* (2013.01); *B05B 13/0431* (2013.01); *B41J 3/4073* (2013.01);
(Continued)

(58) Field of Classification Search
USPC ......... 118/313, 315, 321, 323, 665, 679–681
See application file for complete search history.

(56) References Cited

U.S. PATENT DOCUMENTS 3,421,694 A 1/1969 Muller
3,717,306 A 2/1973 Hushon et al.
(Continued)

FOREIGN PATENT DOCUMENTS

CN 2287527 Y 8/1998
CN 1331661 A 1/2002
(Continued)

OTHER PUBLICATIONS

Non-Final Office Action dated Dec. 13, 2022 in related U.S. Appl. No. 16/468,699 (21 pages).
(Continued)

*Primary Examiner* — Yewebdar T Tadesse
(74) *Attorney, Agent, or Firm* — Bejin Bieneman PLC

(57) ABSTRACT

The disclosure concerns a coating method and a corresponding coating device for coating components with a nozzle applicator with several nozzles, in particular for painting motor vehicle body components. The disclosure provides that the nozzle applicator is flexibly controlled during the coating method.

12 Claims, 5 Drawing Sheets

(51) Int. Cl.
    *B05B 1/14*     (2006.01)
    *B05D 1/02*     (2006.01)
    *B25J 11/00*    (2006.01)

(52) U.S. Cl.
    CPC .................. *B05B 1/14* (2013.01); *B05D 1/02* (2013.01); *B25J 11/0075* (2013.01)

(56) References Cited

U.S. PATENT DOCUMENTS

| | | |
|---|---|---|
| 3,981,320 A | 9/1976 | Wiggins |
| 4,141,231 A | 2/1979 | Kudlich |
| 4,375,865 A | 3/1983 | Springer |
| 4,383,264 A | 5/1983 | Lewis |
| 4,423,999 A | 1/1984 | Choly |
| 4,430,010 A | 2/1984 | Zrenner et al. |
| 4,435,719 A | 3/1984 | Snaper |
| 4,478,241 A | 10/1984 | Cardenas-Franco |
| 4,555,719 A | 11/1985 | Arway et al. |
| 4,593,360 A | 6/1986 | Cocks |
| 4,668,948 A | 5/1987 | Merkel |
| 4,714,044 A | 12/1987 | Kikuchi |
| 4,734,711 A | 3/1988 | Piatt et al. |
| 4,826,135 A | 5/1989 | Mielke |
| 4,894,252 A | 1/1990 | Bongen et al. |
| 4,941,778 A | 7/1990 | Lehmann |
| 4,974,780 A | 12/1990 | Nakamura et al. |
| 4,985,715 A | 1/1991 | Cyphert et al. |
| 5,050,533 A | 9/1991 | Zaber |
| 5,072,881 A | 12/1991 | Taube, III |
| 5,429,682 A * | 7/1995 | Harlow, Jr. ........ G05B 19/4182 118/712 |
| 5,435,884 A | 7/1995 | Simmons et al. |
| 5,538,221 A | 7/1996 | Joswig |
| 5,556,466 A | 9/1996 | Martin et al. |
| 5,602,575 A | 2/1997 | Pauly |
| 5,636,795 A | 6/1997 | Sedgwick et al. |
| 5,647,542 A | 7/1997 | Diana |
| 5,659,347 A | 8/1997 | Taylor |
| 5,681,619 A | 10/1997 | Ogasawara |
| 5,740,967 A | 4/1998 | Simmons et al. |
| 5,843,515 A | 12/1998 | Crum et al. |
| 5,951,882 A | 9/1999 | Simmons et al. |
| 5,964,407 A | 10/1999 | Sandkleiva |
| 5,976,343 A | 11/1999 | Schlaak |
| 6,179,217 B1 | 1/2001 | Yoshida et al. |
| 6,325,302 B1 | 12/2001 | Guzowski |
| 6,540,835 B2 | 4/2003 | Kim et al. |
| 6,607,145 B1 | 8/2003 | Boriani et al. |
| 6,641,667 B2 | 11/2003 | Ochiai et al. |
| 6,712,285 B2 | 3/2004 | Provenaz et al. |
| 6,777,032 B2 | 8/2004 | Ogasahara et al. |
| 6,811,807 B1 | 11/2004 | Zimmermann et al. |
| 6,849,684 B2 | 2/2005 | Poppe et al. |
| 7,160,105 B2 | 1/2007 | Edwards |
| 7,178,742 B2 | 2/2007 | Nellentine et al. |
| 7,182,815 B2 | 2/2007 | Katagami et al. |
| 7,244,310 B2 | 7/2007 | Edwards |
| 7,270,712 B2 | 9/2007 | Edwards |
| 7,357,959 B2 | 4/2008 | Bauer |
| 7,387,071 B2 | 6/2008 | Heinke et al. |
| 7,449,070 B2 | 11/2008 | Fellingham |
| 7,604,333 B2 | 10/2009 | Horsnell |
| 7,757,632 B2 | 7/2010 | Edwards |
| 7,837,071 B2 | 11/2010 | Achrainer |
| 7,901,741 B2 | 3/2011 | Katagami et al. |
| 8,028,651 B2 | 10/2011 | Rademacher et al. |
| 8,118,385 B2 | 2/2012 | Van De Wynckel et al. |
| 8,449,087 B2 | 5/2013 | Kataoka et al. |
| 8,545,943 B2 | 10/2013 | Frankenberger et al. |
| 8,652,581 B2 | 2/2014 | Merchant |
| 8,678,535 B2 | 3/2014 | Beier et al. |
| 8,875,655 B2 | 11/2014 | Pettersson et al. |
| 8,882,242 B2 | 11/2014 | Beier et al. |
| 9,010,899 B2 | 4/2015 | Harjee et al. |
| 9,108,424 B2 | 8/2015 | Wallsten et al. |
| 9,140,247 B2 | 9/2015 | Herre et al. |
| 9,156,054 B2 | 10/2015 | Ikushima |
| 9,266,353 B2 | 2/2016 | Beier et al. |
| 9,393,787 B2 | 7/2016 | Ikushima |
| 9,464,573 B2 | 10/2016 | Remy et al. |
| 9,592,524 B2 | 3/2017 | Fritz et al. |
| 9,701,143 B2 | 7/2017 | Ikushima |
| 9,707,585 B2 | 7/2017 | Reimert et al. |
| 9,844,792 B2 | 12/2017 | Pettersson et al. |
| 9,901,945 B2 | 2/2018 | Fehr et al. |
| 9,914,150 B2 | 3/2018 | Pettersson et al. |
| 10,016,977 B2 | 7/2018 | Stefani et al. |
| 10,105,946 B2 | 10/2018 | Nakamura et al. |
| 10,150,304 B2 | 12/2018 | Herre et al. |
| 10,252,552 B2 | 4/2019 | Pitz et al. |
| 10,272,677 B2 | 4/2019 | Stefani et al. |
| 10,464,095 B2 * | 11/2019 | Fritz .................... B05B 12/084 |
| 10,532,569 B2 | 1/2020 | Wallsten et al. |
| 10,814,643 B2 * | 10/2020 | Herre .................... B41J 3/4073 |
| 11,504,735 B2 * | 11/2022 | Fritz .................... B41J 3/543 |
| 2001/0006392 A1 | 7/2001 | Otsuki |
| 2001/0017085 A1 | 8/2001 | Kubo et al. |
| 2001/0019340 A1 | 9/2001 | Kubo et al. |
| 2002/0024544 A1 | 2/2002 | Codos |
| 2002/0043280 A1 | 4/2002 | Ochiai et al. |
| 2002/0043567 A1 | 4/2002 | Provenaz et al. |
| 2002/0105688 A1 | 8/2002 | Katagami et al. |
| 2002/0109741 A1 | 8/2002 | Okabe et al. |
| 2002/0128371 A1 | 9/2002 | Poppe et al. |
| 2003/0020783 A1 | 1/2003 | Sanada |
| 2003/0041884 A1 | 3/2003 | Bahr |
| 2003/0049383 A1 | 3/2003 | Ogasahara et al. |
| 2003/0063154 A1 | 4/2003 | Goto |
| 2004/0028830 A1 | 2/2004 | Bauer |
| 2004/0089234 A1 | 5/2004 | Hagglund et al. |
| 2004/0107900 A1 | 6/2004 | Clifford et al. |
| 2004/0123159 A1 | 6/2004 | Kerstens |
| 2004/0173144 A1 | 9/2004 | Edwards |
| 2004/0221804 A1 | 11/2004 | Zimmermann et al. |
| 2004/0231594 A1 | 11/2004 | Edwards |
| 2004/0238522 A1 | 12/2004 | Edwards |
| 2004/0256501 A1 | 12/2004 | Mellentine et al. |
| 2004/0261700 A1 | 12/2004 | Edwards |
| 2005/0000422 A1 | 1/2005 | Edwards |
| 2005/0015050 A1 | 1/2005 | Mowery et al. |
| 2005/0016451 A1 | 1/2005 | Edwards |
| 2005/0023367 A1 | 2/2005 | Reighard et al. |
| 2005/0156963 A1 | 7/2005 | Song et al. |
| 2005/0243112 A1 | 11/2005 | Kobayashi et al. |
| 2006/0061613 A1 | 3/2006 | Fienup et al. |
| 2006/0068109 A1 | 3/2006 | Frankenberger et al. |
| 2006/0146379 A1 | 7/2006 | Katagami et al. |
| 2006/0238587 A1 | 10/2006 | Horsnell |
| 2006/0251796 A1 | 11/2006 | Fellingham |
| 2007/0062383 A1 | 3/2007 | Gazeau |
| 2007/0292626 A1 | 12/2007 | Larsson et al. |
| 2008/0271674 A1 | 11/2008 | Rademarcher |
| 2008/0309698 A1 | 12/2008 | Nakano et al. |
| 2009/0027433 A1 | 1/2009 | Van De Wynckel et al. |
| 2009/0029069 A1 | 1/2009 | Edwards |
| 2009/0117283 A1 | 5/2009 | Herre |
| 2009/0181182 A1 | 7/2009 | Sloan |
| 2009/0244216 A1 | 10/2009 | Niimi |
| 2010/0132612 A1 | 6/2010 | Achrainer |
| 2010/0156970 A1 | 6/2010 | Ikushima |
| 2010/0170918 A1 | 7/2010 | Achrainer |
| 2010/0225685 A1 | 9/2010 | Kwon et al. |
| 2010/0279013 A1 | 11/2010 | Frankenberger et al. |
| 2010/0282283 A1 | 11/2010 | Bauer |
| 2010/0321448 A1 | 12/2010 | Buestgens et al. |
| 2011/0014371 A1 | 1/2011 | Herre et al. |
| 2011/0084150 A1 | 4/2011 | Merchant |
| 2011/0248046 A1 | 10/2011 | Simion |
| 2011/0262622 A1 | 10/2011 | Herre |
| 2012/0085842 A1 | 4/2012 | Ciardella |
| 2012/0105522 A1 | 5/2012 | Wallsten |
| 2012/0114849 A1 | 5/2012 | Melcher |
| 2012/0162331 A1 | 6/2012 | Kataoka |
| 2012/0186518 A1 | 7/2012 | Herre |

(56) References Cited

U.S. PATENT DOCUMENTS

| | | |
|---|---|---|
| 2012/0219699 A1 | 8/2012 | Pettersson et al. |
| 2012/0249679 A1 | 10/2012 | Beier et al. |
| 2012/0282405 A1 | 11/2012 | Herre |
| 2013/0201243 A1 | 8/2013 | Yoshida |
| 2013/0215203 A1 | 8/2013 | Chen |
| 2013/0257984 A1 | 10/2013 | Beier et al. |
| 2013/0284833 A1 | 10/2013 | Fritz et al. |
| 2014/0076985 A1 | 3/2014 | Pettersson et al. |
| 2014/0120457 A1* | 5/2014 | Choi ................ H01M 8/1004 429/534 |
| 2014/0242285 A1 | 8/2014 | Pettersson et al. |
| 2014/0329001 A1 | 11/2014 | Rouaud et al. |
| 2015/0009254 A1 | 1/2015 | Kaiba et al. |
| 2015/0042716 A1 | 2/2015 | Beier et al. |
| 2015/0086723 A1 | 3/2015 | Bustgens |
| 2015/0098028 A1 | 4/2015 | Ohnishi |
| 2015/0328654 A1 | 11/2015 | Scwab |
| 2015/0375258 A1 | 12/2015 | Fritz et al. |
| 2015/0375507 A1 | 12/2015 | Ikushima |
| 2016/0001322 A1 | 1/2016 | Fritz et al. |
| 2016/0052312 A1 | 2/2016 | Pitz et al. |
| 2016/0074822 A1 | 3/2016 | Han |
| 2016/0288552 A1 | 10/2016 | Ikushima |
| 2016/0306364 A1 | 10/2016 | Ikushima |
| 2017/0087837 A1 | 3/2017 | Stefani et al. |
| 2017/0106393 A1 | 4/2017 | Hamspon et al. |
| 2017/0128962 A1 | 5/2017 | Kashiyama et al. |
| 2017/0136481 A1 | 5/2017 | Fritz et al. |
| 2017/0252765 A1 | 9/2017 | Medard et al. |
| 2017/0267002 A1 | 9/2017 | Pitz et al. |
| 2017/0299088 A1 | 10/2017 | Rau |
| 2017/0361346 A1 | 12/2017 | Lahidjanian et al. |
| 2018/0022105 A1 | 1/2018 | Nakamura et al. |
| 2018/0056670 A1 | 3/2018 | Kerr |
| 2018/0093491 A1 | 4/2018 | Murayama et al. |
| 2018/0178505 A1 | 6/2018 | Stefani et al. |
| 2018/0222186 A1 | 8/2018 | Stefani et al. |
| 2018/0250955 A1 | 9/2018 | Herre |
| 2019/0091712 A1 | 3/2019 | Medard et al. |

FOREIGN PATENT DOCUMENTS

| | | |
|---|---|---|
| CN | 1411914 A | 4/2003 |
| CN | 1438942 A | 8/2003 |
| CN | 1512919 A | 7/2004 |
| CN | 1176815 C | 11/2004 |
| CN | 1668386 A | 9/2005 |
| CN | 1761530 A | 4/2006 |
| CN | 101264698 A | 9/2008 |
| CN | 101309755 A | 11/2008 |
| CN | 101657264 A | 2/2010 |
| CN | 101784348 A | 7/2010 |
| CN | 102177002 A | 9/2011 |
| CN | 102198434 A | 9/2011 |
| CN | 102971080 A | 3/2013 |
| CN | 103153483 A | 6/2013 |
| CN | 103909743 A | 7/2014 |
| CN | 104613205 A | 5/2015 |
| CN | 104994966 A | 10/2015 |
| CN | 105358259 A | 2/2016 |
| CN | 205042649 U | 2/2016 |
| CN | 106414081 A | 2/2017 |
| DE | 1284250 A | 11/1968 |
| DE | 7710895 U1 | 9/1977 |
| DE | 3045401 A1 | 7/1982 |
| DE | 3221327 A1 | 9/1983 |
| DE | 3225554 A1 | 1/1984 |
| DE | 3634747 A1 | 8/1987 |
| DE | 3804092 A1 | 9/1988 |
| DE | 4013322 A1 | 10/1991 |
| DE | 4115111 A1 | 11/1991 |
| DE | 4138491 A1 | 5/1993 |
| DE | 9405600 U1 | 6/1994 |
| DE | 68924202 T2 | 2/1996 |
| DE | 19606716 C1 | 8/1997 |
| DE | 19630290 A1 | 1/1998 |
| DE | 19731829 A1 | 1/1999 |
| DE | 19743804 A1 | 4/1999 |
| DE | 9422327 U1 | 3/2000 |
| DE | 19852079 A1 | 5/2000 |
| DE | 19936790 A1 | 2/2001 |
| DE | 20017629 U1 | 3/2001 |
| DE | 10048749 A1 | 4/2002 |
| DE | 69429354 T2 | 5/2002 |
| DE | 69622407 T2 | 3/2003 |
| DE | 10307719 A1 | 9/2003 |
| DE | 60001898 T2 | 2/2004 |
| DE | 102004021223 A1 | 12/2004 |
| DE | 10331206 A1 | 1/2005 |
| DE | 102004034270 A1 | 2/2006 |
| DE | 102004044655 A1 | 3/2006 |
| DE | 102004049471 A1 | 4/2006 |
| DE | 60212523 T2 | 2/2007 |
| DE | 69836128 T2 | 8/2007 |
| DE | 60125369 T2 | 10/2007 |
| DE | 102006021623 A1 | 11/2007 |
| DE | 102006056051 A1 | 5/2008 |
| DE | 102007018877 A1 | 10/2008 |
| DE | 60132100 T2 | 12/2008 |
| DE | 102007037663 A1 | 2/2009 |
| DE | 10 2008 018 881 A1 | 9/2009 |
| DE | 102008053178 A1 | 5/2010 |
| DE | 102009029946 A1 | 12/2010 |
| DE | 102009038462 A1 | 3/2011 |
| DE | 102010004496 A1 | 7/2011 |
| DE | 102010019612 A1 | 11/2011 |
| DE | 102012006371 A1 | 7/2012 |
| DE | 102012005087 A1 | 10/2012 |
| DE | 102012005650 A1 | 9/2013 |
| DE | 102012212469 A | 1/2014 |
| DE | 102012109123 A1 | 3/2014 |
| DE | 202013101134 U1 | 6/2014 |
| DE | 102013002412 A1 | 8/2014 |
| DE | 102013011107 A1 | 8/2014 |
| DE | 102013205171 A1 | 9/2014 |
| DE | 102014006991 A1 | 12/2014 |
| DE | 102014007523 A1 | 11/2015 |
| DE | 102014008183 A1 | 12/2015 |
| DE | 10 2014 217 892 A1 | 3/2016 |
| DE | 102014012705 A1 | 3/2016 |
| DE | 102014013158 A1 | 3/2016 |
| DE | 10 2016 014 952 A1 | 6/2018 |
| EP | 0138322 A1 | 4/1985 |
| EP | 0297309 A2 | 1/1989 |
| EP | 0665106 A2 | 8/1995 |
| EP | 1120258 A2 | 8/2001 |
| EP | 1270086 A1 | 1/2003 |
| EP | 1764226 A1 | 3/2007 |
| EP | 1852733 A1 | 11/2007 |
| EP | 1884365 A1 | 2/2008 |
| EP | 1946846 A2 | 7/2008 |
| EP | 2002898 A1 | 12/2008 |
| EP | 2133154 A2 | 12/2009 |
| EP | 2151282 A1 | 2/2010 |
| EP | 2196267 A2 | 6/2010 |
| EP | 2380744 A2 | 10/2011 |
| EP | 2433716 A1 | 3/2012 |
| EP | 2468512 A1 | 6/2012 |
| EP | 2641661 A1 | 9/2013 |
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 2367771 A | 4/2002 |
| GB | 2507069 A | 4/2014 |

(56) References Cited

FOREIGN PATENT DOCUMENTS

| | | |
|---|---|---|
| JP | S5722070 A | 2/1982 |
| JP | S62116442 A | 5/1987 |
| JP | H04-106669 U | 9/1992 |
| JP | H0798171 B2 | 10/1995 |
| JP | H09192583 A | 7/1997 |
| JP | 2011206958 A | 6/2000 |
| JP | 2000317354 A | 11/2000 |
| JP | 2001129456 A | 5/2001 |
| JP | 2001157863 A | 6/2001 |
| JP | 2001239652 A | 9/2001 |
| JP | 2001300404 A | 10/2001 |
| JP | 2005501745 A | 1/2002 |
| JP | 2002361863 A | 12/2002 |
| JP | 2003506210 A | 2/2003 |
| JP | 2003136030 A | 5/2003 |
| JP | 2003164780 A | 6/2003 |
| JP | 2004528956 A | 9/2004 |
| JP | 2004337710 A | 12/2004 |
| JP | 2000158670 A | 9/2005 |
| JP | 2005526234 A | 9/2005 |
| JP | 2007021760 A | 2/2007 |
| JP | 2007152666 A | 6/2007 |
| JP | 2007520340 A | 7/2007 |
| JP | 2007245633 A | 9/2007 |
| JP | 2007289848 A | 11/2007 |
| JP | 2008110332 A | 5/2008 |
| JP | 2009006324 A | 1/2009 |
| JP | 2010528852 A | 8/2010 |
| JP | 2010531213 A | 9/2010 |
| JP | 2010531729 A | 9/2010 |
| JP | 2010241003 A | 10/2010 |
| JP | 2012011310 A | 1/2012 |
| JP | 2012506305 A | 3/2012 |
| JP | 2012135925 A | 7/2012 |
| JP | 2012206116 A | 10/2012 |
| JP | 2012228643 A | 11/2012 |
| JP | 2012228660 A | 11/2012 |
| JP | 2013067179 A | 4/2013 |
| JP | 2013530816 A | 8/2013 |
| JP | 2013188706 A | 9/2013 |
| JP | 2014019140 A | 2/2014 |
| JP | 2014050832 A | 3/2014 |
| JP | 2014111307 A | 6/2014 |
| JP | 2015-009222 A | 1/2015 |
| JP | 2015027636 A | 2/2015 |
| JP | 2015096322 A | 5/2015 |
| JP | 2015520011 A | 7/2015 |
| JP | 2015193129 A | 11/2015 |
| JP | 2015535735 A | 12/2015 |
| JP | 2016507372 A | 3/2016 |
| JP | 2016526910 A | 9/2016 |
| JP | 2016175077 A | 10/2016 |
| JP | 2016175662 A | 10/2016 |
| JP | 2018012065 A | 1/2018 |
| JP | 2020513311 A | 5/2020 |
| JP | 2020513314 A | 5/2020 |
| WO | 8601775 A1 | 3/1986 |
| WO | 9856585 A1 | 12/1998 |
| WO | 02098576 A1 | 12/2002 |
| WO | 2003021519 A1 | 3/2003 |
| WO | 2003062129 A2 | 7/2003 |
| WO | 2004142382 A | 5/2004 |
| WO | 2004048112 A1 | 6/2004 |
| WO | 2004085738 A2 | 10/2004 |
| WO | 2005016556 A1 | 2/2005 |
| WO | 2005075170 A1 | 8/2005 |
| WO | 2006022217 A1 | 3/2006 |
| WO | 2007121905 A1 | 11/2007 |
| WO | 2009019036 A1 | 2/2009 |
| WO | 2010046064 A1 | 4/2010 |
| WO | 2010146473 A1 | 12/2010 |
| WO | 2011044491 A1 | 4/2011 |
| WO | 2011128439 A1 | 10/2011 |
| WO | 2011138048 A1 | 11/2011 |
| WO | 2013121565 A1 | 8/2013 |
| WO | 2014121916 A1 | 8/2014 |
| WO | 2014121927 A1 | 8/2014 |
| WO | 2015071270 A1 | 5/2015 |
| WO | 2015096322 A1 | 7/2015 |
| WO | 2015186014 A1 | 12/2015 |
| WO | 2016-087016 A1 | 6/2016 |
| WO | 2016142510 A1 | 9/2016 |
| WO | 2016145000 A1 | 9/2016 |
| WO | 2017006245 A1 | 1/2017 |
| WO | 2017006246 A1 | 1/2017 |
| WO | 2018102846 A1 | 6/2018 |
| WO | 2018108565 A1 | 6/2018 |

OTHER PUBLICATIONS

Non-Final Office Action for related U.S. Appl. No. 16/468,699 dated Mar. 9, 2022 (180 pages).
Final Office Action dated Aug. 17, 2022 for U.S. Appl. No. 16/468,699 (26 pages).
JPO Decision to Grant in related application No. JP2019-532030 dated Dec. 1, 2022 (6 pages; English machine translation provided).
EPO Notification of Objection dated May 18, 2022 for Patent No. EP3718643, related to related U.S. Appl. No. 16/468,693 (55 pages; with English machine translation).
Non-Final Office Action dated Dec. 24, 2021 for related U.S. Appl. No. 16/468,693 (19 pages).
Ghasem, G. et al.; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
JPO Submission for JP2019-531096; submitted Dec. 21, 2020 (32 pages; with English translation).
JPO Submission for JP2019-531957; submitted Dec. 21, 2020 (21 pages; with English translation).
Japenese Patent Office Notice of Reasons of Refusal for Application No. JP 2019-531967 dated Jun. 8, 2021 (8 pages; with English machine translation).

(56) References Cited

OTHER PUBLICATIONS

Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2—2.1.3.5 Process Time Constant, (pp. 99-102). Taylor & Francis. Retrieved from https://app.knovel.com/hotlink/pdf/id:kt00CC7HL1/instrument-engineers/process-time-constant (Year: 2006).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
JPO Office Action dated Jul. 13, 2021 for Application No. JP2019-532024 (12 pages; with English machine translation).
Non-Final Office Action dated Aug. 27, 2021 for U.S. Appl. No. 16/468,695 (149 pages).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Notice of Allowance mailed in U.S. Appl. No. 16/468,689 dated Jun. 2, 2021 (38 pages).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Final Office Action dated May 13, 2021 for U.S. Appl. No. 16/468,691 (70 pages).
JPO Decision to Grant dated Oct. 5, 2021 for Application No. JP2019-532113 (7 pages; with English machine translation).
Final Office Action dated Oct. 7, 2021 for U.S. Appl. No. 16/468,693 (58 pages).
Non-Final Office Action for U.S. Appl. No. 16/468,691 dated Jan. 7, 2021 (79 pages).
China National Intellectual Property Administration Office Action and Search Report for CN Application No. 201780077018.3 dated Aug. 27, 2020 (11 pages; Search Report in English).
Chinese Office Action and Search Report for CN201780077603.3 dated Oct. 12, 2020 (15 pages; English translation not available).
European Search Report for EP20170638.9 dated Sep. 14, 2020 (4 pages—English translation not available).
European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
EPO Examination Report for Application No. 201702818.1 dated Dec. 18, 2020 (with English machine translation; 6 pages).
EPO Official Notification of Opposition for Application No. 17821803.8 dated Feb. 10, 2021 (64 pages; with English machine translation).
Non-Final Office Action dated Apr. 28, 2021 for U.S. Appl. No. 16/468,693 (109 pages).
Final Office Action dated Apr. 19, 2021 for U.S. Appl. No. 16/468,700 (62 pages).
Final Office Action dated Jun. 11, 2021 for U.S. Appl. No. 16/468,701 (64 pages).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
Non Final Office Action for U.S. Appl. No. 16/468,700 dated Dec. 1, 2020 (73 pages).
Final Office Action dated Mar. 19, 2021 for U.S. Appl. No. 16/468,696 (45 pages).
Non-Final Office Action dated Nov. 23, 2021 for U.S. Appl. No. 16/468,694 (25 pages).
JPO Decision to Grant in related application JP2019-532012 dated Jan. 25, 2022 (6 pages; with English machine translation).
Chinese Office Action in related application No. CN201780077045.0 dated Jan. 29, 2022 (17 pages; English machine translation provided).
Non-Final Office Action dated Jan. 6, 2022 for related U.S. Appl. No. 16/468,701 (36 pages).
USPTO Non-Final Office Action dated Jun. 23, 2023 for related U.S. Appl. No. 17/740,537 (107 pages).
USPTO Non-Final Office Action dated Jun. 26, 2023 for related U.S. Appl. No. 17/965,062 (85 pages).
Huo Lijiang, "Packaging Printing Technology", 1st edition, pp. 321-323, Printing Industry Press, Sep. 30, 2011 (10 pages; with English machine translation).
Chinese Patent Office—Office Action for Application No. CN202211512023.1 dated Aug. 16, 2023 (26 pages; with English machine translation).

* cited by examiner

COATING METHOD AND CORRESPONDING COATING DEVICE

CROSS-REFERENCE TO RELATED APPLICATIONS

This application is a continuation of, and claims priority to, U.S. patent application Ser. No. 16/468,690, filed on Jun. 12, 2019, which application is a national stage of, and claims priority to, Patent Cooperation Treaty Application No. PCT/EP2017/081114, filed on Dec. 1, 2017, which application claims priority to German Application No. DE 10 2016 014 944.2, filed on Dec. 14, 2016, which applications are hereby incorporated herein by reference in their entireties.

BACKGROUND

The disclosure concerns a coating method for the coating of components with a nozzle applicator with several nozzles, in particular for painting motor vehicle body components.

For the serial painting of motor vehicle body components, rotary atomizers have usually been used as application devices up to now, but they have the disadvantage of a limited application efficiency, i.e. only a part of the applied paint deposits on the components to be coated, while the rest of the applied paint has to be disposed of as a so-called overspray.

A newer development line, on the other hand, provides for so-called printheads as application device, as known for example from DE 10 2013 002 412 A1, U.S. Pat. No. 9,108,424 B2 and DE 10 2010 019 612 A1. In contrast to the known rotary atomizers, such printheads do not emit a spray of the paint to be applied, but a narrowly confined paint jet, which is almost completely deposited on the component to be painted, so that almost no overspray occurs.

However, such printheads are not yet sufficiently well suited for surface coating, since high area coating performance and accuracy are required for the series coating of motor vehicle body components.

Furthermore, there is the problem that wraps around component edges and complex surface geometries on the outer skin or in the interior of motor vehicle body components cannot be painted satisfactorily.

The technical background of the disclosure can also be found in EP 3 002 128 A2, US 2001/0019340 A1 and EP 2 196 267 A2.

The disclosure is therefore based on the task of creating the possibility of making such nozzle applicators (e.g. printheads) suitable for the series painting of series-produced motor vehicle body components.

DETAILED DESCRIPTION

Figure 1A:
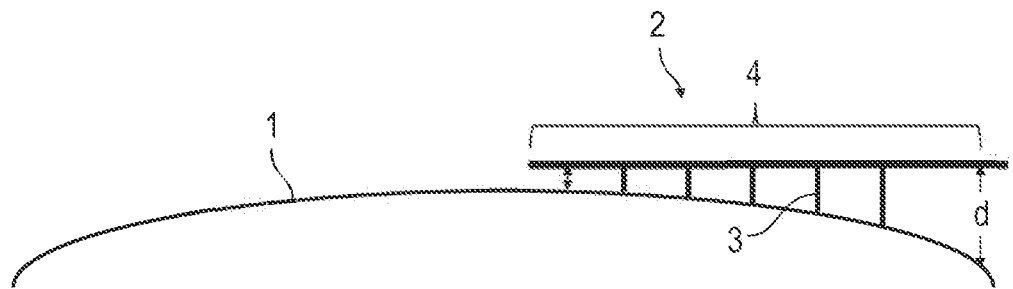
FIG. 1A a schematic illustration of the painting of heavily curved component surfaces according to the state of the art, FIG. 1B a modification according to the disclosure for the painting of strongly curved component surfaces, where a part of the nozzles of the nozzle applicator is deactivated, FIG. 2A a schematic illustration to illustrate the painting with a small area coating performance, whereby the nozzle applicator is aligned in the longitudinal direction of the movement path, FIG. 2B a schematic illustration for painting with a large area coating performance, where the nozzle applicator is aligned transversely to the movement path, FIG. 3A a schematic representation of a nozzle applicator which emits continuous coating agent jets, FIG. 3B a schematic representation of a nozzle applicator that emits droplet jets, FIG. 4 a schematic representation of the surface coating along a meandering movement path, partly with a droplet application and partly with a jet application, FIG. 5 a schematic representation of a painting device according to the disclosure with a camera-based measuring system, FIG. 6 a modification of FIG. 5 with sensors on the individual painting robots to improve relative positioning, and FIGS. 7-9 modifications of FIG. 4.

The disclosure relates to flexibly controlling a nozzle applicator (e.g. printhead) during a coating method, for example by a flexible fluid-technical or valve-technical control or by a flexible mechanical guidance of the nozzle applicator.

The term "nozzle applicator" used in the disclosure is to be generally understood and initially only serves to distinguish it from conventional atomizers (e.g. rotary atomizers, ultrasonic atomizers, airmix atomizers, airless atomizers, etc.), which do not emit a narrowly limited coating agent jet but a spray of the coating agent to be applied. The term "nozzle applicator" implies that at least one nozzle emits a coating agent jet which is relatively narrowly limited in space. Preferably, however, the nozzle applicator is a printhead as it is known from the state of the art and is described for example in DE 10 2013 002 412 A1, U.S. Pat. No. 9,108,424 B2 and DE 10 2010 019 612 A1.

In one example of the disclosure, the nozzle applicator is designed for the application of a paint (e.g. base coat, clear coat, water-based paint, solvent-based paint, etc.). However, the term "coating agent" used in the disclosure is not limited to paints, but can also include other coating agents, such as adhesives, insulating materials, sealants, primers, etc., to name but a few examples.

The coating method according to the disclosure provides that the nozzle applicator is guided over the surface of the component to be coated, which is preferably done by means of a multi-axis coating robot with serial robot kinematics and at least six or seven movable robot axes.

The nozzle applicator is flexibly controlled according to the disclosure. For example, the nozzle applicator can be flexibly controlled using valves, for example by releasing or blocking the nozzles with control valves in the nozzle applicator in order to control the release of the coating agent. Another option for flexible control is that the amount of coating agent supplied and applied can be flexibly adjusted. It is also possible to flexibly control the nozzle applicator mechanically, for example by rotating, tilting or positioning or aligning the nozzle applicator during the coating method, e.g. by essentially aligning it orthogonal to the coating surface.

In an example of the disclosure, the nozzle applicator is selectively operated with a large area coating performance or with a small area coating performance.

The high area coating performance is then selected to coat large component surfaces, such as the outer surfaces of motor vehicle body components.

The small area coating performance of the nozzle applicator, on the other hand, is selected when details are to be coated, especially in the interior or on edges or design lines of the motor vehicle body components to be painted.

The switching between the large area coating performance and the small area coating performance can be carried out automatically and program-controlled depending on the type of the respective colour impact point.

If, for example, the colour impact point is located on a large surface area of the roof of a motor vehicle body component to be painted, the nozzle applicator should coat the coating agent with a large area coating performance.

If, on the other hand, the colour impact point is in the interior or on an edge or a design line of the motor vehicle body component to be painted, the nozzle applicator should preferably be operated with the small area coating performance.

In this context it should be mentioned that the disclosure is not limited to a certain large area coating performance and a certain small area coating performance, i.e. two different area coating performances. Rather, it is also possible within the scope of the disclosure that the area coating performance is continuously adapted.

In one example of the disclosure, the nozzles in the nozzle applicator are arranged next to each other in a nozzle row, whereby several parallel nozzle rows with several nozzles each are also possible. The nozzle applicator is moved along a preset, programmed ("teached") movement path over the surface of the component to be coated (e.g. motor vehicle body component), which—as already briefly mentioned above—can be done by means of a multi-axis coating robot with serial robot kinematics and at least six or seven movable robot axes.

If the nozzle applicator is now to be operated with the high area coating performance, the nozzle applicator is rotated around the jet axis of the coating agent jets in such a way that the nozzle row is aligned transversely (e.g. at right angles) to the movement path. The nozzle applicator thus covers a relatively large component area per time unit. The formulation used in the disclosure of an alignment of the nozzle row transverse to the movement path means preferably that the angle between the nozzle row and the movement path is greater than 50°, 60°, 75°, 80° or 85°.

If, on the other hand, the nozzle applicator is to be operated with the small area coating performance, the nozzle applicator is rotated around the jet axis in a preferred variant so that the nozzle row is aligned longitudinally (e.g. parallel) to the movement path. The nozzle applicator then covers a relatively small component area per time unit. The formulation used in the context of the disclosure of an alignment of the nozzle row along the movement path means preferably that the angle between the nozzle row and the movement path is smaller than 60°, 50°, 40°, 30°, 25°, 20°, 15°, 10° or 5°.

It should also be mentioned that the nozzle applicator can be rotated during movement, i.e. within a coating path. This can be distinguished from a rotation of the nozzle applicator only at the beginning or end of a movement path or at the turning points of a meandering movement path.

It has already been mentioned briefly above that the nozzle applicator can have several parallel nozzle rows in which several nozzles are arranged next to each other. Here it is possible that one or more nozzle rows of the nozzle applicator are activated or deactivated depending on the desired area coating performance.

If the nozzle applicator is to be operated with a small area coating performance, it is preferable that not all nozzle rows of the nozzle applicator are activated, in particular only a single nozzle row or individual nozzles of a nozzle row. This is helpful, for example, to keep the coating distance within an ideal tolerance window or to allow the coating agent to impinge almost orthogonally on the component surface.

If, on the other hand, the nozzle applicator is to be operated with a large area coating performance, more than one nozzle row of the nozzle applicator is preferably activated, in particular all nozzle rows.

It should be mentioned here that the number of activated or deactivated nozzle rows of the nozzle applicator does not have to be switched between a maximum value and a minimum value. Within the scope of the disclosure, there is also the possibility that the nozzle rows can be individually switched on or off in order to increase or decrease the area coating performance accordingly and thus enable a quasi continuous adjustment of the area coating performance.

In an example of the disclosure, the flexible adjustment of the control of the nozzle applicator is carried out by switching the nozzle applicator between a jet mode and a drop mode.

In the jet mode, the nozzle applicator emits a coating agent jet which is connected in the longitudinal direction of the coating agent jet, in contrast to a droplet jet which consists of droplets which are separated from each other in the longitudinal direction of the droplet jet. For this purpose, the painting distance should be chosen so that the coating agent jet is not subject to natural decay.

In the drop mode, however, the nozzle applicator emits a droplet jet consisting of droplets which are separated from each other in the longitudinal direction of the droplet jet, in contrast to the coating agent jet which is connected in the longitudinal direction of the coating agent jet.

The jet mode may be selected program-controlled when a surface coating with a high area coating performance is required, for example for painting large outer surfaces of a motor vehicle body component.

The drop mode, on the other hand, is preferably used under program control if coating is to take place in the overlapping area of coating agent paths or at the beginning or end of the path.

In addition, the drop mode can be used advantageously if detailed painting is to be carried out or if graphics are to be applied to the component surface.

In general, it is also possible that when coating a component surface, the inner surfaces of the component surface are coated with the jet mode, while the edges of the component surface are coated with the drop mode.

It should also be mentioned here that the droplet jet and the continuous coating agent jet can be emitted simultaneously with the same nozzle applicator. This means that a droplet jet is emitted from at least one nozzle while at the same time a continuous coating agent jet is emitted from at least one other nozzle of the same nozzle applicator.

Alternatively it is possible that the droplet jet and the continuous coating agent jet are alternately discharged with the same nozzle applicator. This means that the nozzle applicator is switched over between the drop mode and the jet mode and then works either only in the drop mode or in the jet mode.

Alternatively, in an applicator with several nozzle plates, one nozzle plate can be operated in the jet mode and another in the drop mode.

Alternatively, it is also possible to use several nozzle applicators, whereby a first nozzle applicator operates in the drop mode while a second nozzle applicator operates in the jet mode.

The disclosure also allows two nozzle applicators to be guided by a coating robot over the component surface of the component to be coated and then coat the component surface together. A prerequisite for such a cooperation between two coating robots and the nozzle applicators guided by these two coating robots, however, is a very precise relative positioning of the two nozzle applicators. This is particularly relevant when the two nozzle applicators apply coating agent paths that abut against each other, since mispositions are then easily visible. An undesired overlapping of the coating agent then leads to an overcoating, i.e. to an excessive thickness of the coating in the overlapping area. If, on the other hand, the distance between the nozzle applicators is too large, gaps can occur between the adjacent coating agent paths, which can also be disruptive. The two nozzle applicators are therefore guided over the component surface of the component to be coated by the two coating robots with a high relative positioning accuracy with a very small positioning tolerance. This relative positioning tolerance is preferably smaller than 2 mm, 1 mm, 500 µm, 200 µm, 100 µm or even 50 µm.

This smaller positioning tolerance cannot, however, be easily achieved in painting systems for the painting of motor vehicle body components. In addition, the usual multi-axis painting robots have a certain positioning tolerance depending on the design. On the other hand, the motor vehicle body components to be painted are also conveyed by a conveyor through the painting system, whereby the conveyor also has a relatively large positioning tolerance.

The disclosure therefore preferably provides for an optical measurement system to determine the spatial position of the coating object and/or the two nozzle applicators. Thus, within the scope of the disclosure, it is possible to adjust tolerance-related positioning errors so that the desired high relative positioning accuracy is achieved.

For example, such an optical measurement system can be camera-based and optically detects markers on the coating robots and/or on the nozzle applicators.

Alternatively, it is also possible for the coating robots to have sensors, for example on the robot hand axes or on the nozzle applicators themselves, in order to detect the relative positioning of the two nozzle applicators, which in turn enables appropriate readjustment to achieve the desired high positioning accuracy.

Another problem is the coating of heavily curved component surfaces, such as motor vehicle body components. This is because the application distance between the nozzles of the nozzle applicator and the component surface changes continuously. Furthermore, the application distance between the nozzles within the nozzle applicator is not uniform, so that a uniform control of the nozzle applicator can lead to problems due to the different application distance of the individual nozzles.

In another example of the disclosure, it is therefore planned that when coating strongly curved component surfaces, only a first part of the nozzles is activated, preferably a relatively small, connected part of the nozzles, so that within the activated part of the nozzles there is as uniform an application distance as possible with as orthogonal an orientation of the coating agent jets as possible.

When coating less curved component surfaces and in particular when coating flat component surfaces, a larger second part of the nozzles is preferably activated in order to achieve the greatest possible area coating performance.

In addition to the coating method according to the disclosure described above, the disclosure also includes a corresponding coating device (e.g. paint shop), whereby the structure and function of this coating device are already apparent from the above description, so that reference is made to the above description in order to avoid repetitions.

In the following, the drawing according to FIG. 1A is described, which illustrates the conventional painting of a curved component surface 1 of a motor vehicle body component using a nozzle applicator 2.

The nozzle applicator has numerous nozzles, each of which emits a coating agent jet, whereby the nozzle applicator 2 has an active part 4, within which all nozzles of the nozzle applicator 2 are active and emit the coating agent jets 3. The active part 4 of the nozzle applicator 2 conventionally includes all nozzles of the nozzle applicator 2, i.e. all nozzles of the nozzle applicator 2 emit a coating agent jet 3, which also applies to the coating of strongly curved component surfaces. As a result, however, the application distance d indicated by the double arrows is very non-uniform within the nozzle applicator 2. For example, the application distance d is very small for the nozzle on the left of the nozzle applicator 2 in the drawing, while the application distance d is very large for the nozzle on the right in the drawing. This non-uniformity of the application distance d within the nozzle applicator 2 can, however, lead to a corresponding inhomogeneity of the coating on the component surface 1.

Figure 1B:
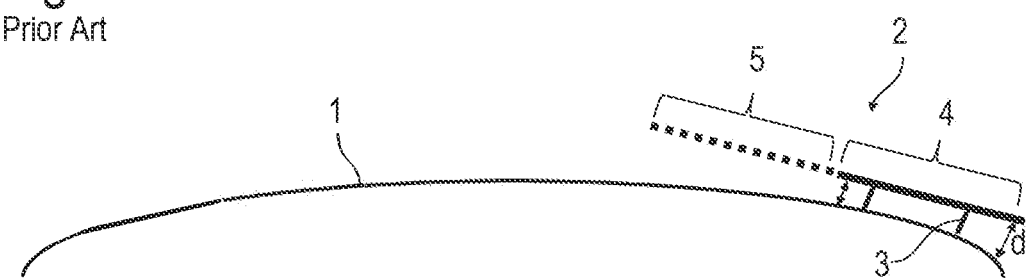

This problem is solved by the solution according to the disclosure shown in FIG. 1B. For example, the drawing here shows a state when painting a strongly curved area of the component surface 1. The active part 4 of the nozzle applicator 2 then comprises only a part of the nozzles, while the nozzles in an inactive part 5 of the nozzle applicator 2 are deactivated. Within the active part 4 of the nozzle applicator 2, however, the application distance d is relatively uniform, as indicated by the double arrows, which have a relatively uniform length within the active part 4 of the nozzle applicator 2. This avoids inhomogeneities of the coating on the component surface 1, which are caused by a strong component curvature, as is the case with the state of the art.

Figure 2A:
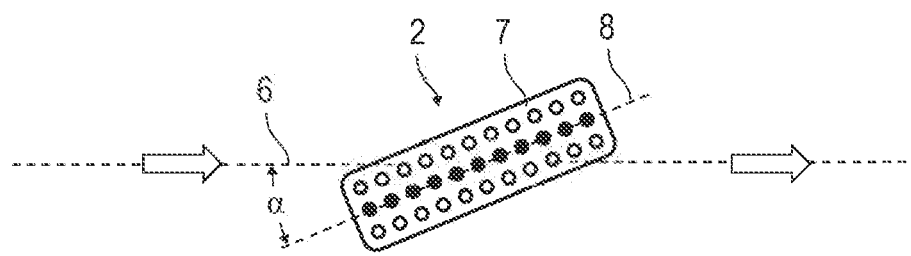
Figure 2B:
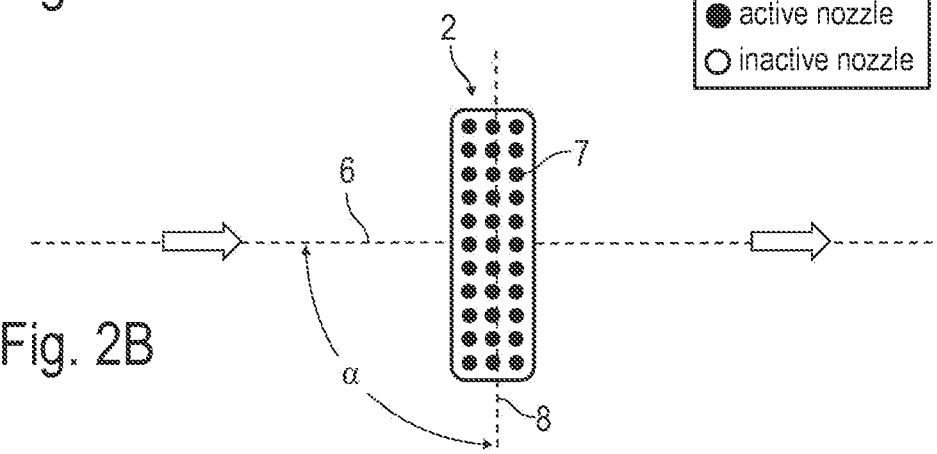

FIGS. 2A and 2B show a modification that is partially consistent with the above example, so that reference is made to the above description to avoid repetition, using the same reference signs for corresponding details.

It should first be mentioned that the nozzle applicator 2 is guided along a programmed ("taught") movement path 6 over the component surface by a multi-axis painting robot with a serial robot kinematics, where the drawing shows only a small section of the movement path 6 to illustrate the principle of the disclosure.

It should also be mentioned that the nozzle applicator has several parallel nozzle rows, each with several nozzles 7, which can be switched either inactive or active. The active nozzles are shown as filled circles, while the inactive nozzles are shown as circular rings.

It should also be mentioned that the nozzles 7 are arranged next to each other in one of three nozzle rows 8.

The multi-axis painting robot now rotates the nozzle applicator 2 during the movement along the movement path 6 depending on the desired area coating performance.

FIG. 2A shows the rotation of nozzle applicator 2 for painting with a small area coating performance. In this operating mode, the nozzle applicator 2 with the nozzle row 8 is aligned parallel to movement path 6, with only one of the three nozzle rows being active and emitting coating agent jets. The nozzle applicator 2 then works with a relatively small area coating performance, but with sharp edges and largely without steps.

However, the nozzle applicator need not necessarily be parallel to the movement path. Rather, it may be turned in a preferred variation at any angle α especially $\alpha<60°$, $\alpha<45°$ or $\alpha<20°$ to the movement path.

FIG. 2B however shows turning of the nozzle applicator 2 to achieve a large area coating performance. The multi-axis painting robot then rotates the nozzle applicator 2 with the nozzle rows 8 at an angle α>60°, α>75° or at right angles (α=90°) to the movement path 6. As a result, the nozzle applicator 2 covers a relatively large component surface per time unit. In this operating mode, all nozzle rows 8 of nozzle applicator 2 are also active, i.e. all nozzles 7 in all three nozzle rows 8 emit a coating agent jet each to achieve sufficient coating thickness and a high area coating performance. This operating mode can be selected, for example, to paint large external surfaces of motor vehicle body components.

Figure 3A:
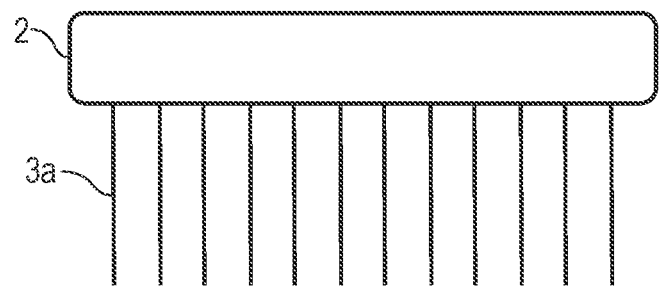

FIG. 3A shows a further modification which again partly corresponds to the examples described above so that reference is made to the above description to avoid repetitions, using the same reference signs for the corresponding details.

Here the nozzle applicator 2 emits continuous coating agent jets 3a which are connected in the longitudinal direction of the coating agent jet 3a. This mode of operation may be useful, for example, for painting large external surfaces with a high area coating performance.

Figure 3B:
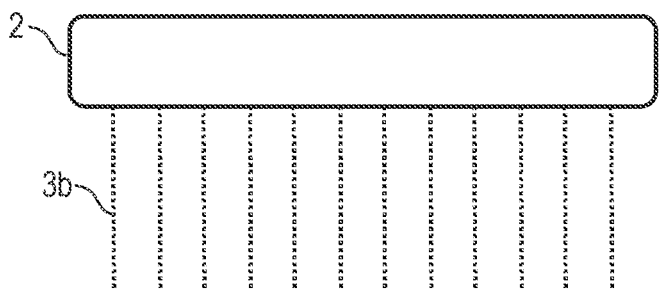

FIG. 3B, on the other hand, shows another possible operating mode in which the individual nozzles of the nozzle applicator 2 each emit a droplet jet 3b consisting of numerous droplets spaced apart from one another in the longitudinal direction of the droplet jet 3d. This operating mode can be useful, for example, in the overlapping area of adjacent coating paths or at the beginning or end of a coating path, or for detailed painting, to name just a few examples.

It should be mentioned that the nozzle applicator 2 can be switched between the operating mode shown in FIG. 3A (continuous coating agent jet 3a) and the operating mode shown in FIG. 3B (droplet jet 3b).

Figure 4:
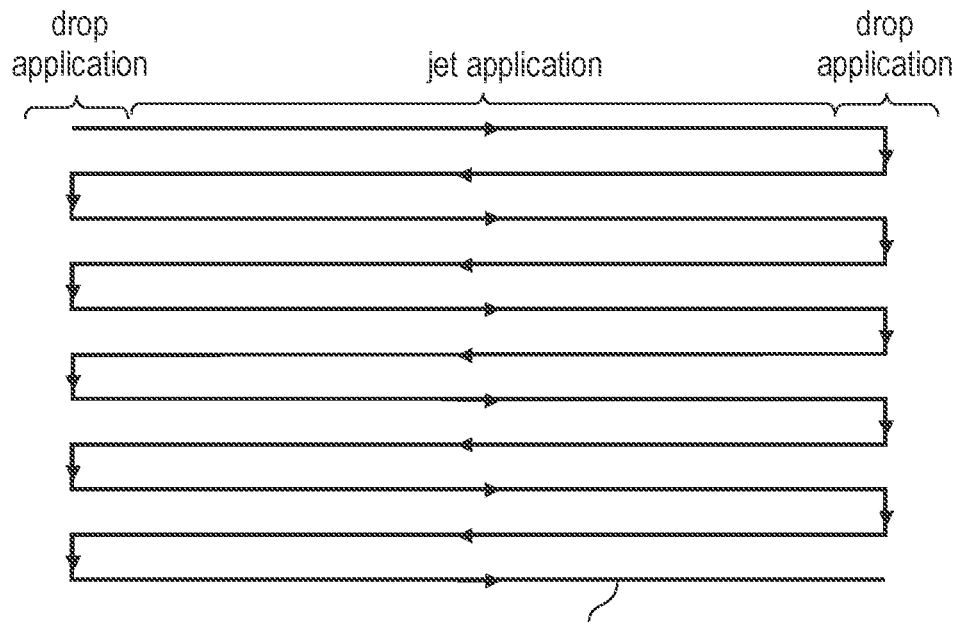

FIG. 4 shows a schematic representation of a meandering movement path 9, where the nozzle applicator is guided along the meandering movement path 9 over the component surface by a multi-axis painting robot program.

Here it can be useful if the nozzle applicator 2 applies the droplet jets 3b in the area of the turning points, whereas the nozzle applicator 2 applies the continuous coating agent jets 3a between the turning points.

The drawing speed of the nozzle applicator 2 for the application of the droplet jets 3b may differ from the drawing speed for the application of the continuous coating agent jets 3a, in particular it may be lower.

Figure 5:
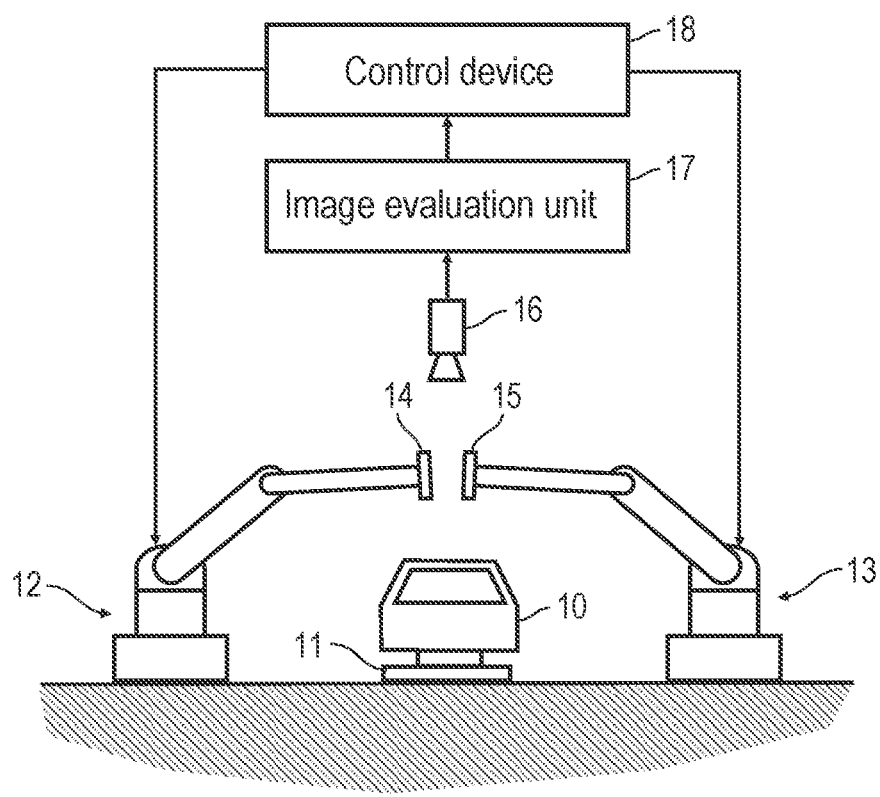

FIG. 5 shows a schematic, highly simplified representation of a painting system according to the disclosure for painting motor vehicle body components 10, which are conveyed by a conveyor 11 along a painting line at right angles to the drawing plane.

The painting is done by two painting robots 12, 13 with a serial robot kinematics and more than six movable robot hand axes, whereby the painting robots 12, 13 are shown here only schematically.

The painting robots 12, 13 each guide a nozzle applicator 14, 15, whereby the nozzle applicators 14, 15 interact during painting, which requires a very high relative positioning accuracy when positioning the nozzle applicators 14, 15. However, the required relative positioning accuracy cannot be easily achieved since both the painting robots 12, 13 and the conveyor 11 each have relatively coarse positioning tolerances.

In this example, a camera-based measuring system is provided to measure the actual relative positioning of the nozzle applicators 14, 15 and/or the motor vehicle body component 10 and thus to be able to adjust the positioning so that the required positioning tolerances of less than 200 µm are maintained.

The camera-based measuring system has a camera 16, which takes an image of the nozzle applicators 14, 15 and the component surface and forwards it to an image evaluation unit 17.

The image evaluation unit 17 then determines the relative positioning of the two nozzle applicators 14, 15 by means of an image evaluation and, if necessary, controls a control device 18 in such a way that the painting robots 12, 13 are controlled subsequently, since the desired relative positioning of the nozzle applicators 14, 15 is achieved with the required high positioning accuracy. The absolute position of the motor vehicle body components 10 can also be determined here.

Figure 6:
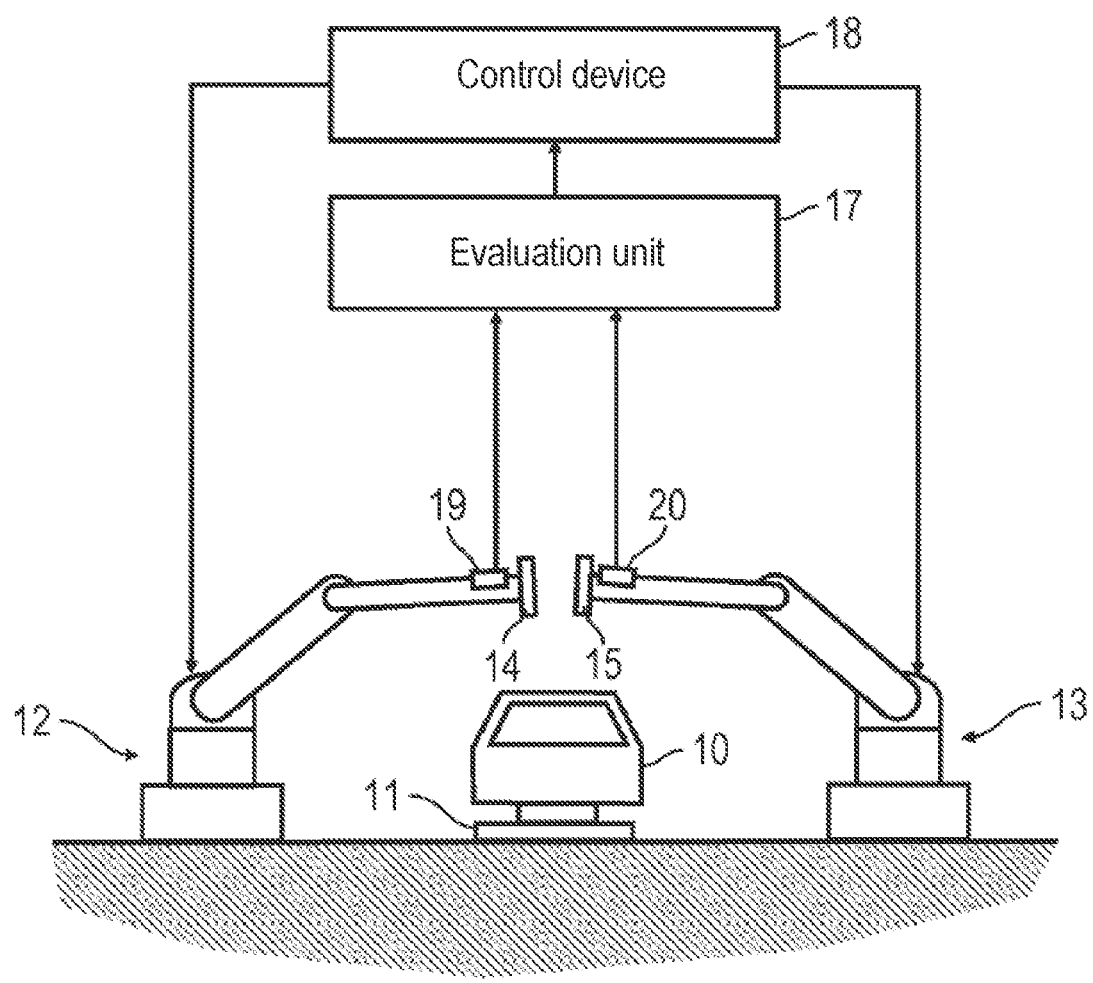

FIG. 6 shows a modification of FIG. 5, so that the above description is referred to avoid repetitions, whereby the same reference signs are used for the corresponding details.

A feature of this example is that, in contrast to the example in FIG. 5, no camera-based optical measurement system is provided. Rather, sensors 19, 20 are attached to the robot hand axes of the two painting robots 12, 13, which detect the relative positioning of the two nozzle applicators 14, 15 and forward them to the image evaluation unit 17.

Figure 7:
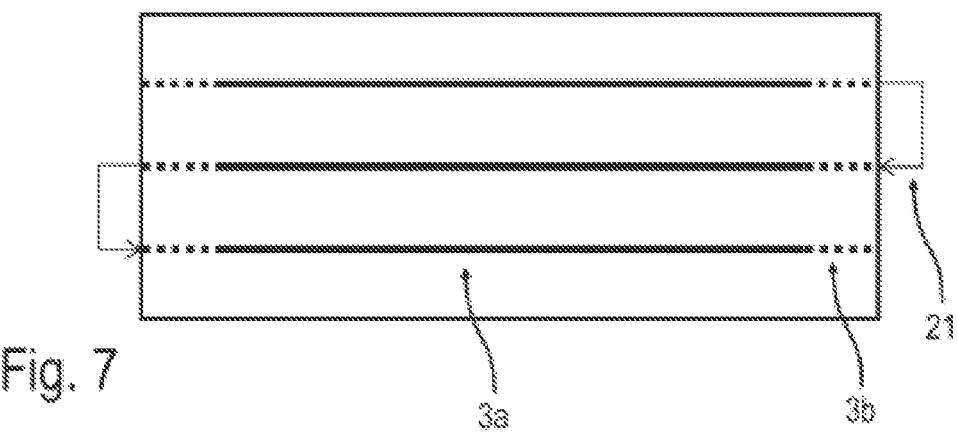
Figure 8:
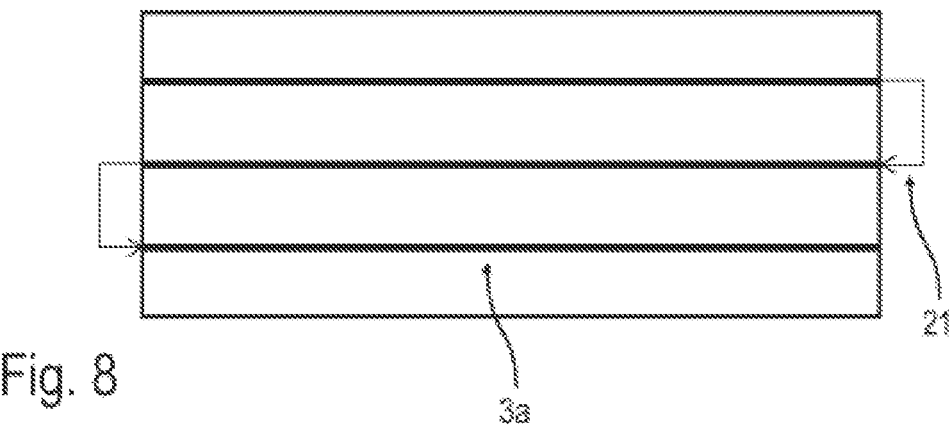
Figure 9:
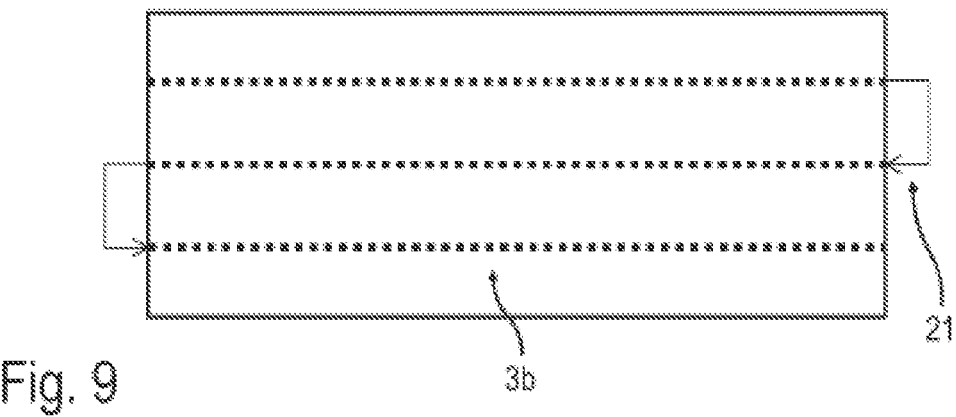

FIGS. 7-9 show a modification of FIG. 4, so that to avoid repetitions, reference is made to the above description of FIG. 4, using the same reference signs for corresponding details.

A feature of the example according to FIG. 4 is that the coating agent jets 3b are briefly switched off outside of the component surface to be coated at turning points 21, i.e. not on the component surface to be coated.

Within the component surface to be coated, coating is applied with the continuous coating agent jets 3a, whereas coating is applied with the droplet jet 3a at the edges of the component surface to be coated.

The example shown in FIG. 8 differs from this by the fact that coating is applied throughout with the continuous coating agent jet 3a.

In the example shown in FIG. 9, on the other hand, the spray is applied continuously with the droplet jet 3a.

The disclosure is not limited to the examples described above. Rather, a large number of variants and modifications are possible, which also make use of the disclosure's idea and therefore fall within the scope of protection.

The invention claimed is:

1. A coating device for coating components with a coating agent, comprising:
   a) a nozzle applicator having a plurality of nozzles for applying the coating agent to the components to be coated, the nozzles in the nozzle applicator arranged next to one another in a nozzle row,
   b) a multi-axis coating robot which guides the nozzle applicator along a predetermined movement path over a surface of the components to be coated, and
   c) a control device which controls the nozzle applicator and the multi-axis coating robot,
   d) wherein the control device is configured to:
      i. flexibly control the nozzle applicator during the movement over the surface;
      ii. selectively operate the nozzle applicator with a large area coating performance or with a small area coating performance;
      iii. control the coating robot in such a way that the nozzle applicator is rotated along the predetermined movement path during the movement;

iv. control the coating robot to rotate the nozzle applicator in such a way that the nozzle row is aligned transversely relative to the predetermined movement path when coating with the large area coating performance; and v. control the coating robot to rotate the nozzle applicator in such a way that the nozzle row is aligned longitudinally relative to the predetermined movement path when coating with the small area coating performance.

2. The coating device according to claim 1, wherein
a) the nozzle applicator has a plurality of parallel nozzle rows in each of which a plurality of nozzles are arranged next to one another,
b) the control device controls the nozzle applicator in such a way that, during the coating with the small area coating performance, not all nozzle rows of the nozzle applicator are activated, and
c) the control device controls the nozzle applicator in such a way that more than one nozzle row of the nozzle applicator is activated during the coating with the large area coating performance.

3. The coating device according to claim 1, wherein
a) the control device is configured to selectively operate the nozzle applicator in a jet mode or in a drop mode,
b) in the jet mode, the nozzles of the nozzle applicator emit a coating agent jet which is connected in the longitudinal direction of the coating agent jet, in contrast to a droplet jet which consists of droplets which are separated from one another in the longitudinal direction of the droplet jet, and
c) in the drop mode, the nozzles of the nozzle applicator emit a droplet jet which consists of droplets which are separated from one another in the longitudinal direction of the droplet jet, in contrast to the coating agent jet which is connected in the longitudinal direction of the coating agent jet.

4. The coating device according to claim 1, wherein
a) a first nozzle applicator is guided by a first coating robot over the surface,
b) a second nozzle applicator is guided by a second coating robot over the surface, and
c) the two nozzle applicators are positioned above the surface by the coating robots with a large relative positioning accuracy with a positioning tolerance of less than 2 mm.

5. The coating device according to claim 4, wherein the spatial position of the two nozzle applicators is measured by means of an optical measurement system in order to achieve the large relative positioning accuracy.

6. The coating device according to claim 4, wherein the coating robots have sensors in order to detect their relative position and thereby enable the large relative positioning accuracy.

7. The coating device according to claim 1, wherein
a) the nozzle applicator is a printhead, and
b) the nozzle applicator emits a narrowly limited coating agent jet in contrast to a spray mist, and
c) the nozzle applicator has an application efficiency of at least 80% so that substantially all of the applied coating agent is completely deposited on the component without overspray.

8. The coating device according to claim 7, wherein
a) the nozzle applicator has an area coating performance of at least 0.5 $m^2$/min, and
b) the volume flow of the applied coating agent and thus the exit velocity of the coating agent is set in such a way that the coating agent does not bounce off the component after it hits the component, and
c) the exit velocity of the coating agent from the printhead is at least 5 m/s; and
d) the exit velocity of the coating agent from the printhead is not more than 30 m/s; and
e) the application distance between a nozzle of the plurality of nozzles and the surface is at least 4 mm, and
f) the application distance between the nozzle of the plurality of nozzles and the surface is at most 200 mm, and
g) the coating agent is a paint, and
h) the nozzle applicator has at least one electrically controllable actuator in order to eject drops of the coating agent from the nozzle applicator.

9. A coating device for coating components with a coating agent, comprising:
a) a nozzle applicator having a plurality of nozzles for applying the coating agent to the components to be coated,
b) a multi-axis coating robot which guides the nozzle applicator along a predetermined movement path over a surface of the components to be coated,
c) a control device which controls at least one of the nozzle applicator and the multi-axis coating robot,
d) wherein the control device flexibly controls the nozzle applicator during the movement over the surface, and
e) wherein the control device is configured to selectively operate the nozzle applicator:
   i. in a jet mode in which the nozzles of the nozzle applicator emit a coating agent jet which is connected in the longitudinal direction of the coating agent jet, in contrast to a droplet jet which consists of droplets which are separated from one another in the longitudinal direction of the droplet jet; or
   ii. in a drop mode in which the nozzles of the nozzle applicator emit a droplet jet which consists of droplets which are separated from one another in the longitudinal direction of the droplet jet, in contrast to the coating agent jet which is connected in the longitudinal direction of the coating agent jet.

10. The coating device according to claim 9, wherein
a) the control device is configured to operate the nozzle applicator in the jet mode for coating with a high area coating performance, and
b) the control device is configured to operate the nozzle applicator in the drop mode for coating with a small area coating performance.

11. The coating device in accordance with claim 9, wherein the control device is configured to operate the nozzle applicator at the path beginning and at the path end and at turning points of the predetermined movement path in the drop mode and otherwise in the jet mode.

12. The coating device according to claim 9, wherein the control device is configured to operate the nozzle applicator in the overlapping region of overlapping coating paths in the drop mode and otherwise in the jet mode.

* * * * *